United States Patent [19]

Uehara

[11] 3,980,356

[45] Sept. 14, 1976

[54] ROLLER ASSEMBLY

[75] Inventor: Takeo Uehara, Uozu, Japan

[73] Assignee: Yoshida Kogyo Kabushiki Kaisha, Tokyo, Japan

[22] Filed: Aug. 7, 1975

[21] Appl. No.: 602,556

[30] Foreign Application Priority Data

Aug. 13, 1974 Japan ................................ 49-96787

[52] U.S. Cl. .................................................. 308/3.8
[51] Int. Cl.$^2$ .......................................... F16C 29/00
[58] Field of Search ................ 308/3.6, 3.9, 20, 3.8; 193/37; 29/110 R, 116 R; 312/312, 334, 349, 350

[56] References Cited

UNITED STATES PATENTS 3,078,131 2/1963 Beeck ................................. 308/3.8

*Primary Examiner*—M. H. Wood, Jr.
*Assistant Examiner*—Gene A. Church
*Attorney, Agent, or Firm*—Hill, Gross, Simpson, Van Santen, Steadman, Chiara & Simpson

[57] ABSTRACT

A roller assembly including fixing means for securing the roller assembly to a bottom rail of a window sash or a door. The roller assembly has a hollow outer frame in which is provided a pair of vertical legs each having a ledge disposed in a slot formed through a side wall of the outer frame. A screw having a countersunk head in the outer frame upon clockwise rotation urges the ledges to be pressed against side panels of the bottom rail, thereby holding the roller assembly in place within the bottom rail in correct center alignment with the latter. There are also provided a pair of projections formed on the side walls of the outer frames and adapted to fit in cutaway recesses defined in the side panels of the bottom rail. Another embodiment includes a pair of indented formations drawn out of the planes of resilient plates of the outer frame and adapted to be urged away from each other by the countersunk screw head, thus pressing the outer frame plates against the side panels of the bottom rail.

3 Claims, 5 Drawing Figures

ROLLER ASSEMBLY

BACKGROUND OF THE INVENTION

The present invention relates to a roller assembly and more particularly to means for fixing a roller assembly to a bottom rail of a window sash or a door.

There have heretofore been known various prior art devices of the type described. One of such devices utilized a metal or a wood screw which fastens the outer frame of the roller assembly to the bottom rail. Another conventional proposal was to mount on the outer frame of the roller a resilient material which holds the same resiliently in place in the bottom rail. According to still another prior art device, there was provided a hook on the outer frame for engagement with the bottom rail. However, these conventional devices are encountered with the difficulties that they require troublesome operations in attaching and removing the roller assembly to and from the bottom rail and involve misaligned roller assembly with respect to the bottom rail due primarily to varying dimensions of the latter component, which in turn invite sluggish opening and closing operation of the window sash or the door. Another drawback of the conventional devices is that they are rather difficult to be fabricated into the desired form.

SUMMARY OF THE INVENTION

It is therefore the primary object of this invention to provide a roller assembly including a fixing means which can mount and dismount the roller assembly in and from the bottom rail in a simple manner.

Another object of the invention is to provide a roller assembly including a fixing means which ensures correct center alignment of the roller assembly with respect to the bottom rail regardless of varying dimensions of the bottom rails.

DESCRIPTION OF THE PREFERRED EMBODIMENTS

Figure 1:
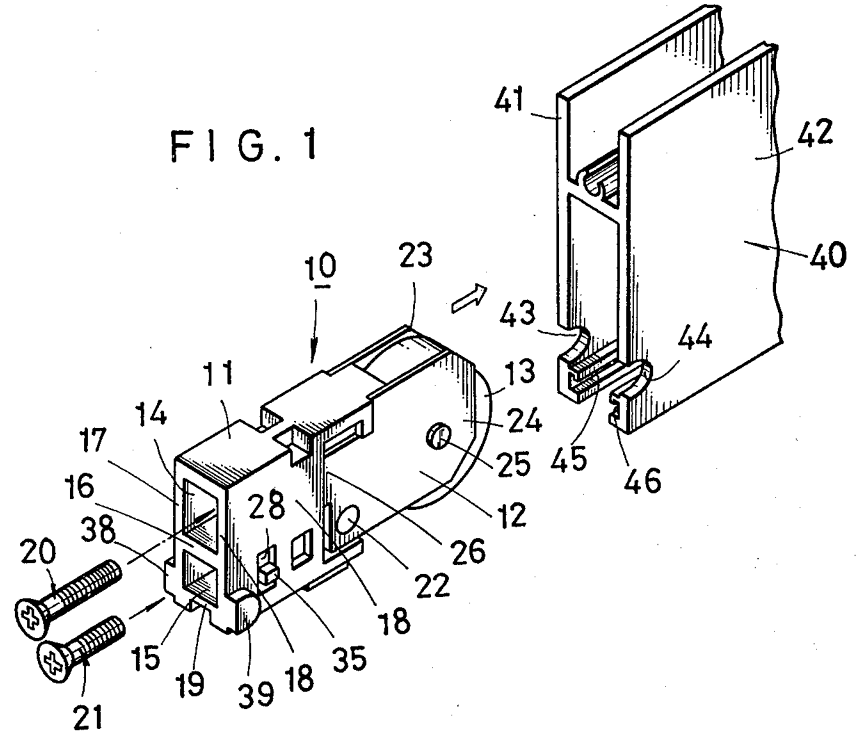
FIG. 1 is a perspective view of a roller assembly which incorporates a first embodiment of a fixing means constructed according to the invention, the roller assembly being shown prior to and ready for installation in the bottom rail.

Referring to the drawings and FIG. 1 in particular, there is shown a roller assembly, generally designated 10, incorporating a first embodiment of a fixing means provided in accordance with the invention. The roller assembly 10 broadly comprises an outer frame 11, an inner frame 12, and a roller wheel 13. The outer frame 11 is formed for example by the injection molding of a plastics material and has a substantially hollow structure which is divided into an upper cavity 14 and a lower cavity 15 by a partition 16 extending longitudinally of the outer frame 11 and formed integral with its side walls 17 and 18. Both of the cavities 14 and 15 are open at a rear end 19 of the outer frame 11 in order to accommodate therein screws 20 and 21, respectively.

The inner frame 12 is pivotally mounted at its rear end on the outer frame 11 by means of a pivot pin 22 and is provided at its front end with flanges 23 and 24. The roller 13 is mounted to rotate between the flanges 23 and 24 about a pin 25 secured to the latter. Vertical adjustment of the roller 13 is achieved by rotating the screw 20 which has been inserted within the upper cavity 14 and engages a rear end 26 of the inner frame 12. A clockwise rotation of the screw 20 causes the inner frame 12 to pivot in a direction to move the roller 13 downwardly, and the counterclockwise rotation of the screw 20 causes the inner frame 12 to rotate in a direction to effect an upward vertical movement of the roller 13. It will be noted that the construction and the manner of adjustment of the roller 13 are well known in the art and hence will not be described in any detail.

Figure 2:
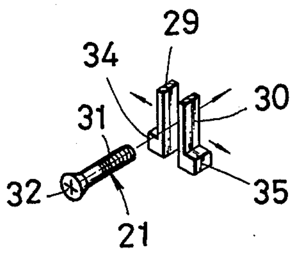
FIG. 2 is a perspective view of a pair of legs and a screw held in cooperative relation.
Figure 3:
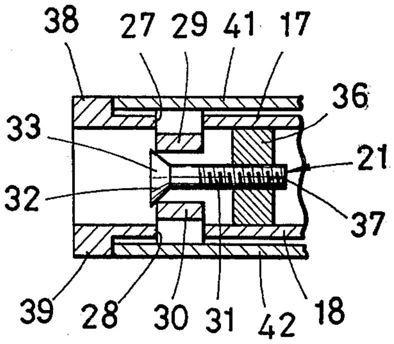
FIG. 3 is a horizontal cross-sectional view, on an enlarged scale, showing the essential parts of the fixing means of FIG. 1.

According to an important concept of the invention, there are provided a pair of legs 29 and 30 which are formed integral with and dependent from the undersurface of the partition 16 as best seen in FIGS. 2 and 3. The legs 29 and 30 are spaced apart in their free state by a distance at least larger than the diameter of a shank 31 of the screw 21 but smaller than that of a countersunk screw head 32 which defines a frustoconical surface 33 for abutting engagement with the legs 29 and 30. The legs 29 and 30 are provided at their lower ends with abutment ledges 34 and 35, respectively, extending laterally in opposite directions and disposed in respective slots 27 and 28 which are formed through the respective side walls 17 and 18 and communicate with the lower cavity 15. Located forwardly of the legs 29 and 30 is a wall 36 extending between and secured to the side walls 17 and 18. The wall 36 is provided centrally with an internally threaded opening 37 to engage threadably with the screw 21. There are provided projections 38 and 39 disposed adjacent the rear end 19 and formed integral with the respective side walls 17 and 18. The projections 38 and 39 project away from each other in the transverse direction of the roller assembly 10 and have rounded front edges remote from the end 19. As seen in FIG. 1, a bottom rail 40 of a window sash or door has a pair of panels 41 and 42 spaced apart a distance sufficient for the reception of the roller assembly 10. The bottom rail 40 is provided at its one longitudinal edge with a pair of cutaway recesses or indents 43 and 44 defined in the lower portions of the panels 41 and 42, respectively, the cutaway recesses 43, 44 being complemental in shape to the projections 38, 39 for snugly receiving the latter as described later. The roller assembly 10 can thus be held stably in place within the bottom rail 40 during attaching operation. Formed beneath the cutaway recesses 43 and 44 are channels 45 and 46 extending along and throughout the length of the rail 40 and adapted to carry sealing strips, not shown.

In order to attach the roller assembly 10 to the bottom rail 40, the roller assembly 10 is inserted between the panels 41 and 42 of the rail 40 until the projections 38 and 39 fit snugly in the cutaway recesses 43 and 44, respectively, whereupon the roller assembly 10 is held provisionally in place at the bottom rail 40 to facilitate the subsequent fixing operation. The screw 21 is then advanced between the legs 28 and 29 and threaded through the internally threaded opening 37. An inspection of FIGS. 2 and 3 indicates that as the screw 21 rotates clockwise and moves to the right, as viewed particularly in FIG. 3, the frustoconical surface 33 of the screw head 32 engages the legs 30 and 31. Further clockwise rotation of the screw 33 causes the legs 29 and 30 to urge themselves to move apart in opposite directions, whereby the ledges 34 and 35 are pressed against the inner surfaces of the rail panels 41 and 42, respectively, when the roller assembly 10 becomes automatically aligned centrally with respect to the bottom rail 40.

Figure 4:
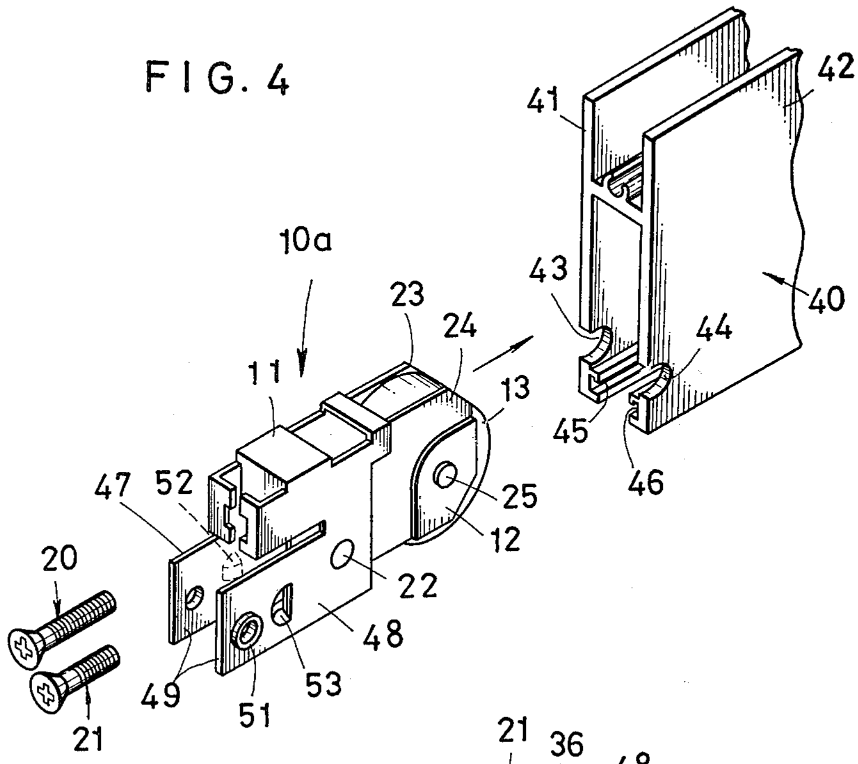
FIG. 4 is a perspective view of a roller assembly having a second embodiment of the fixing means according to the invention.
Figure 5:
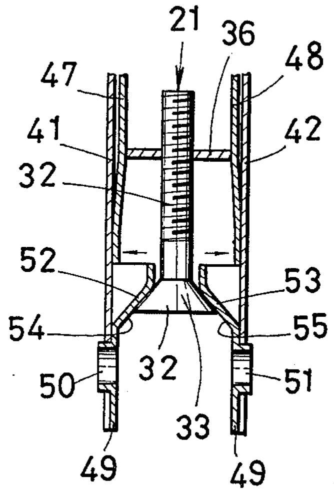
FIG. 5 is a horizontal cross-sectional view, on an enlarged scale, showing the essential parts of the fixing means of FIG. 4.

According to another embodiment shown in FIGS. 4 and 5, a roller assembly **10*a* includes resilient abutment plates 47 and 48 formed integral with the outer frame 11 and extending in a direction opposite to the roller 13. The plates 47 and 48 are provided adjacent their rear ends 49 with respective flanges 50 and 51 which are burred out of the planes of the plates 47, 48 away from one another. The flanges 50 and 51 are aligned transversely of the roller assembly 10*a*. Formed forwardly of the flanges 50 and 51 are indented formations 52 and 53 which are drawn out of the planes of the plates 47, 48 away from the outer surfaces of the latter. The indented formations 52 and 53 project toward each other in transverse alignment and have slanted surfaces 54 and 55, as best seen in FIG. 5. The distance between the indented formations 52 and 53 is smaller than the diameter of the countersunk screw head 32, but larger than that of the screw shank 31.**

With this structure, as soon as the roller assembly 10 is inserted into position on the rail 40 with the flanges 50 and 51 fitted snugly in the cutaway recesses 43 and 44 in the bottom rail 40, respectively, the screw 21 is threaded through the wall 36 until the frustoconical surface 33 engages the slanted surfaces 52 and 53 of the respective formations 50 and 51. As the screw 21 is advanced further the frustoconical surface 33 urges the indented formations 52 and 53 to depart in opposite directions away from each other, whereupon the abutment plates 47 and 48 are pressed against the inner surfaces of the rail panels 41 and 42 to hold the roller assembly 10 in place within the bottom rail 40 in correct central alignment with the latter.

According to the construction of the fixing means herein disclosed, the roller assembly 10 can be installed and held firmly in position in the bottom rail 40 merely by rotating the screw 21. Another advantage is that the bottom rail 40 can be fabricated with ease because there involves no complicated operation to bore and tap the bottom rail.

What is claimed is:

1. A roller assembly including a fixing means comprising an outer frame, an inner frame pivotally mounted on said outer frame, a roller wheel rotatably mounted on said inner frame, and a bottom rail of a window sash or door, said bottom rail being provided with a cutaway recess, said outer frame including side walls, a wall member extending between said side walls and having an internally threaded opening, a screw having a countersunk head and adapted to engage threadably with said opening, and an abutment member arranged adjacent said screw, and a projection formed integral with said side walls and adapted to fit in said cutaway recess of the bottom rail, said countersunk head of the screw being adapted to urge said abutment member to move transversely of the outer frame as said screw is rotated in said opening.

2. A roller assembly including a fixing means as defined in claim 1 wherein said abutment member is a ledge disposed in a slot formed through said side walls and extending from a leg formed integral with said outer frame.

3. A roller assembly including a fixing means as defined in claim 1 wherein said abutment member comprises a plate formed integral with said outer frame and having an indented formation drawn out of the plane of said plate.

* * * * *